United States Patent
Larman

(10) Patent No.: US 10,874,249 B2
(45) Date of Patent: Dec. 29, 2020

(54) CHEF SHIELD

(71) Applicant: Mark Larman, Coral Springs, FL (US)

(72) Inventor: Mark Larman, Coral Springs, FL (US)

(73) Assignee: Chefshield Corporation

( * ) Notice: Subject to any disclaimer, the term of this patent is extended or adjusted under 35 U.S.C. 154(b) by 0 days.

(21) Appl. No.: 15/902,146

(22) Filed: Feb. 22, 2018

(65) Prior Publication Data

US 2018/0242780 A1 Aug. 30, 2018

Related U.S. Application Data

(60) Provisional application No. 62/463,214, filed on Feb. 24, 2017, provisional application No. 62/513,482, filed on Jun. 1, 2017.

(51) Int. Cl.
*A47J 36/36* (2006.01)
*A47J 43/28* (2006.01)

(52) U.S. Cl.
CPC ............. *A47J 36/36* (2013.01); *A47J 43/288* (2013.01)

(58) Field of Classification Search
CPC .............................. A47J 36/36; A47J 43/288
USPC ............ 294/7, 131; 30/322, 323, 326; 2/17; 16/110.1; 248/37.3; D7/637, 688; 7/112
See application file for complete search history.

(56) References Cited

U.S. PATENT DOCUMENTS

| | | | |
|---|---|---|---|
| 116,739 A * | 7/1871 | Murphy | |
| 135,975 A * | 2/1873 | Draper | |
| 376,839 A * | 1/1888 | Wilson | |
| 489,414 A * | 1/1893 | Feicker | |
| 568,024 A * | 9/1896 | Gorman | |
| 621,342 A * | 3/1899 | Holyland | |
| 689,778 A * | 12/1901 | Barnard | |
| 1,147,425 A * | 7/1915 | Ojala | ............... D06F 5/00 294/23.5 |
| 1,160,634 A * | 11/1915 | Maymard | ............... B63B 21/12 114/221 R |
| 1,688,778 A * | 10/1928 | Berry | ................ A47G 21/02 30/137 |
| 2,457,898 A * | 1/1949 | Hummel | ................ A47J 45/08 220/759 |
| 2,694,330 A * | 11/1954 | Davies | ............... B25B 27/0042 81/345 |
| 2,900,051 A | 8/1959 | Sims | |
| 2,900,151 A | 8/1959 | Sims | |
| 3,858,320 A | 1/1975 | Neal et al. | |

(Continued)

FOREIGN PATENT DOCUMENTS

GB 1588907 A 4/1981

*Primary Examiner* — Paul T Chin
(74) *Attorney, Agent, or Firm* — Greg M. Popowitz; Assouline & Berlowe, P.A

(57) ABSTRACT

A chef shield device including an upper clip connected a lower clip, where at least one shield is rotatably connected to a clip, and the upper and lower clips are secured to a cooking utensil. A first connector is used to connect the upper shield to the upper clip and a second connector used to connect the lower shield to the lower clip. The shield includes a frame and panel. A chef shield device including an elongated member secured to a cooking utensil, where at least one shield is secured to the elongated member. A unitary chef shield device, including a cooking utensil where at least one shield is secured to the cooking utensil.

7 Claims, 9 Drawing Sheets

(56) References Cited

U.S. PATENT DOCUMENTS

| | | | | |
|---|---|---|---|---|
| 4,103,420 | A | * | 8/1978 | Davis ................ A47J 36/06 |
| | | | | 294/131 |
| 4,768,288 | A | * | 9/1988 | Culbertson ........... A47G 21/02 |
| | | | | 294/131 |
| 6,115,921 | A | * | 9/2000 | Garneau, Sr. ............ B25G 3/24 |
| | | | | 30/123 |
| 6,131,977 | A | * | 10/2000 | Sacks .................. A47G 21/10 |
| | | | | 294/131 |
| 10,258,193 | B1 | * | 4/2019 | Reed .................. A47J 43/281 |
| 2008/0223997 | A1 | | 9/2008 | Peterson |
| 2013/0061426 | A1 | * | 3/2013 | Achiaz ................. A47J 43/28 |
| | | | | 16/110.1 |
| 2013/0227816 | A1 | | 9/2013 | Achiaz |
| 2015/0305534 | A1 | * | 10/2015 | Gschwind, Jr. ........... F16B 2/10 |
| | | | | 248/227.1 |
| 2019/0371284 | A1 | * | 12/2019 | Ridinger ................. G10D 3/14 |

* cited by examiner

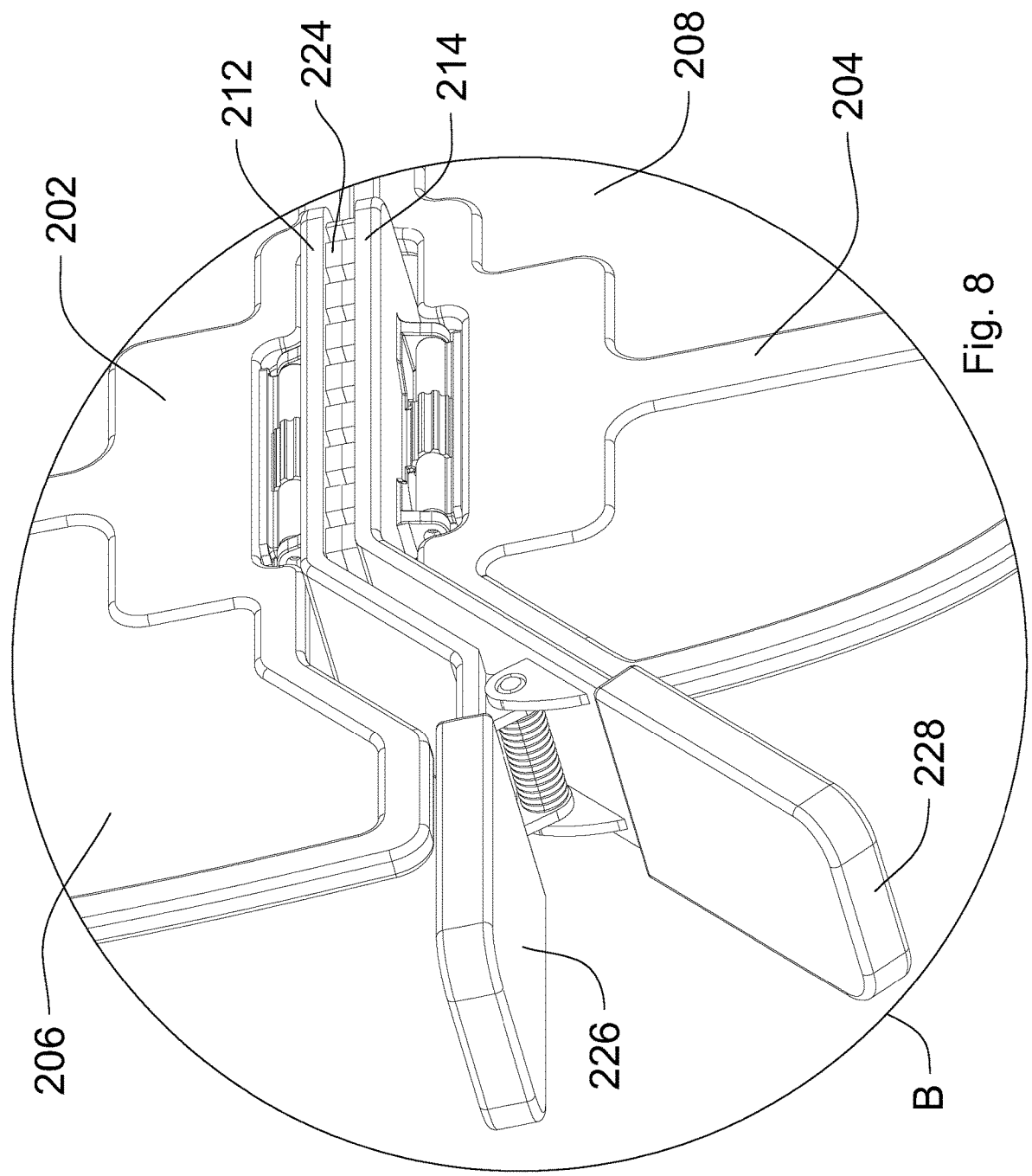

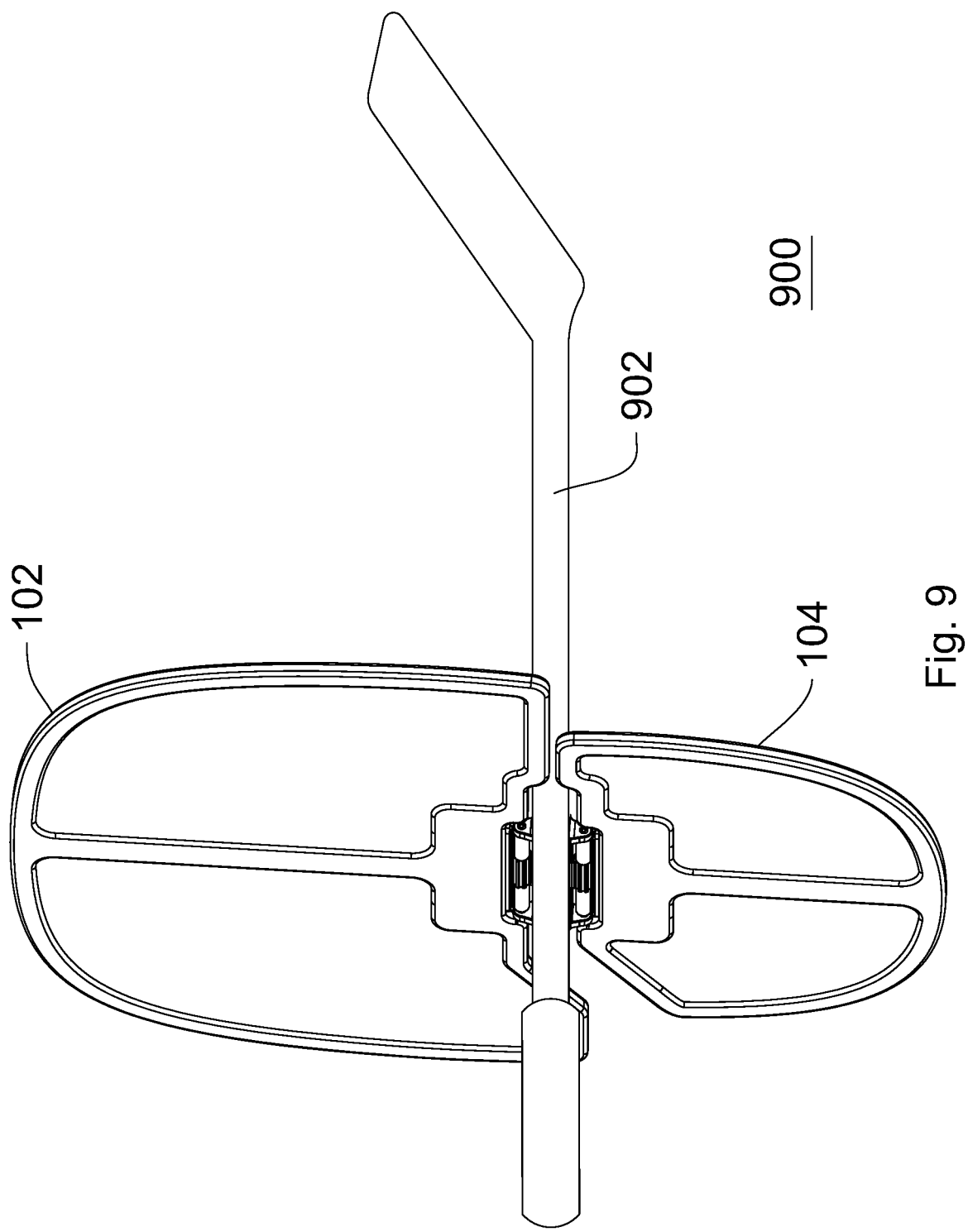

CHEF SHIELD

CROSS-REFERENCE TO RELATED APPLICATIONS

This patent application claims the benefit under 35 U.S.C. § 119(e) of U.S. Provisional Patent Application No. 62/463,214, filed Feb. 24, 2017 and U.S. Provisional Patent Application No. 62/513,482, filed Jun. 1, 2017, which applications are incorporated herein by reference.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

FIELD OF THE INVENTION

The invention broadly relates to a shield for cooking utensils, more specifically to a shield that protects users from debris while cooking, and even more particularly to a shield that is detachable and rotatable to protect users from being burned while cooking.

BACKGROUND OF THE INVENTION

Cooking with hot liquids, including oil, is a dangerous activity. Whether the cooking is for residential or commercial purposes, cooks are always at risk of burning themselves when liquids, e.g. oil, splash out of the hot cooking pan to the surrounding areas, including the cook's hands and arms.

When cooks combine multiple items in the cooking pan, hot liquids often splash onto nearby surfaces, such as other burners, shelving, counter surfaces, etc. However, when the hot liquid splashes onto the cook, the cook is burned, in some cases severely burned. Depending on the violent nature of the splashing liquid from the cooking pan, cooks may burn their hands, arms, face, stomach, and other parts of their body. Oftentimes, the burns require medical attention and leave permanent scars.

Liquids splash out of the cooking pot due to a multitude of reasons. For instance, when cooks place meat into a pan of heated oil, the oil reacts with meat, especially the water within the meat, to create a chemical reaction that sizzles and bubbles. Depending on the severity, the bubbling will splash onto the user. Another situation that puts the cook at risk is when the cook adds wine or other alcoholic beverages to a cooking pan, e.g. flambé. When the alcohol ignites, a blue tinged flame results that often expands outside the cooking surface. This puts the cook in danger of being burned.

Cooks are extremely limited in their actions when hot liquid splashes outside the cooking pan since the cook needs to maintain control of the pan. Absent an emergency, a cook will not remove his/her grip from the handle of the cooking utensil (e.g. spatula) or the handle of the cooking pan. Since the cook does not want to lose control over the cooking pan, the cook needs to protect his body from the splashing oil and heat emanating from the cooking pan.

Some cooks wear long sleeves in an effort to protect their arms from potential burns. Other cooks wear aprons to protect their stomach and chest area from burns. However, other portions of a cook's body remain at risk, such as, but not limited to, hands, face, and neck. Not to mention that typical clothing will not prevent the hot liquid from burning the user as the clothing will absorb the hot liquid and still burn the cook.

Due to the emanating heat and food items splashing out of the cooking surface or pan, the user's hands, arms, and other parts of their body are at risk for burns and injury. The use of the present invention helps prevent the user from getting burned by deflecting the heat and splashing food when the user is using the spatula. Placing the present invention on a cooking utensil, which is in close proximity to the heat source, allows the user to deflect the heat before the heat reaches the user's body.

A cook also needs flexibility to modify the protection available to them depending on the cooking hardware being used and environmental conditions where the cooking is taking place. In some circumstances, the cooking surface and surrounding space dictates the amount of room the chef has to operate. Any protection device will need to have modular and angular flexibility to accommodate the multiple hardware and environmental constraints faced by the chef.

As can be derived from the variety of devices and methods directed at protecting cooks from sustaining burns from cooking, many means have been contemplated to accomplish the desired end, i.e., long sleeves and aprons. Heretofore, tradeoffs between coverage and reliability were required. Thus, there is a long-felt need for a product to minimize hot liquids or debris from reaching the cook's body. There is a further long-felt need for a product located near the cooking pan to shield the cook from the hot debris. There is also a long-felt need for a product attached to or formed part of the cooking pan or utensil handle that the cook holds when cooking.

BRIEF SUMMARY OF THE INVENTION

The present invention broadly comprises a chef shield device that includes an upper clip connected a lower clip, where at least one shield is connected to a clip, and the upper and lower clips are secured to a cooking utensil.

In a further embodiment, the chef shield device includes an elongated member secured to a cooking utensil, where at least one shield is secured to the elongated member.

In yet another embodiment, a unitary chef shield device includes a cooking utensil where at least one shield is secured to the cooking utensil.

It is a general object of the present invention to provide a barrier between the cooking surface and the user to prevent debris from the cooking surface from splashing onto the user.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 8 is a zoomed view B of the invention from FIG. 1.

FIG. 9 is a side perspective view of a unitary cooking utensil with shields.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should also be appreciated that the term "cooking utensil" is synonymous with terms for items that includes a handle, such as "spatula", "skimmer", "cooking fork", "spoon", "tongs", "whisks", "ladles", "strainer", "wok", "frying pan", "sauce pans", "griddles", "sauté pan", "omelet pan", etc., and such terms may be used interchangeably as appearing in the specification and claims. Although any methods, devices or materials similar or equivalent to those described herein can be used in the practice or testing of the invention, the preferred methods, devices, and materials are now described.

Figure 1:
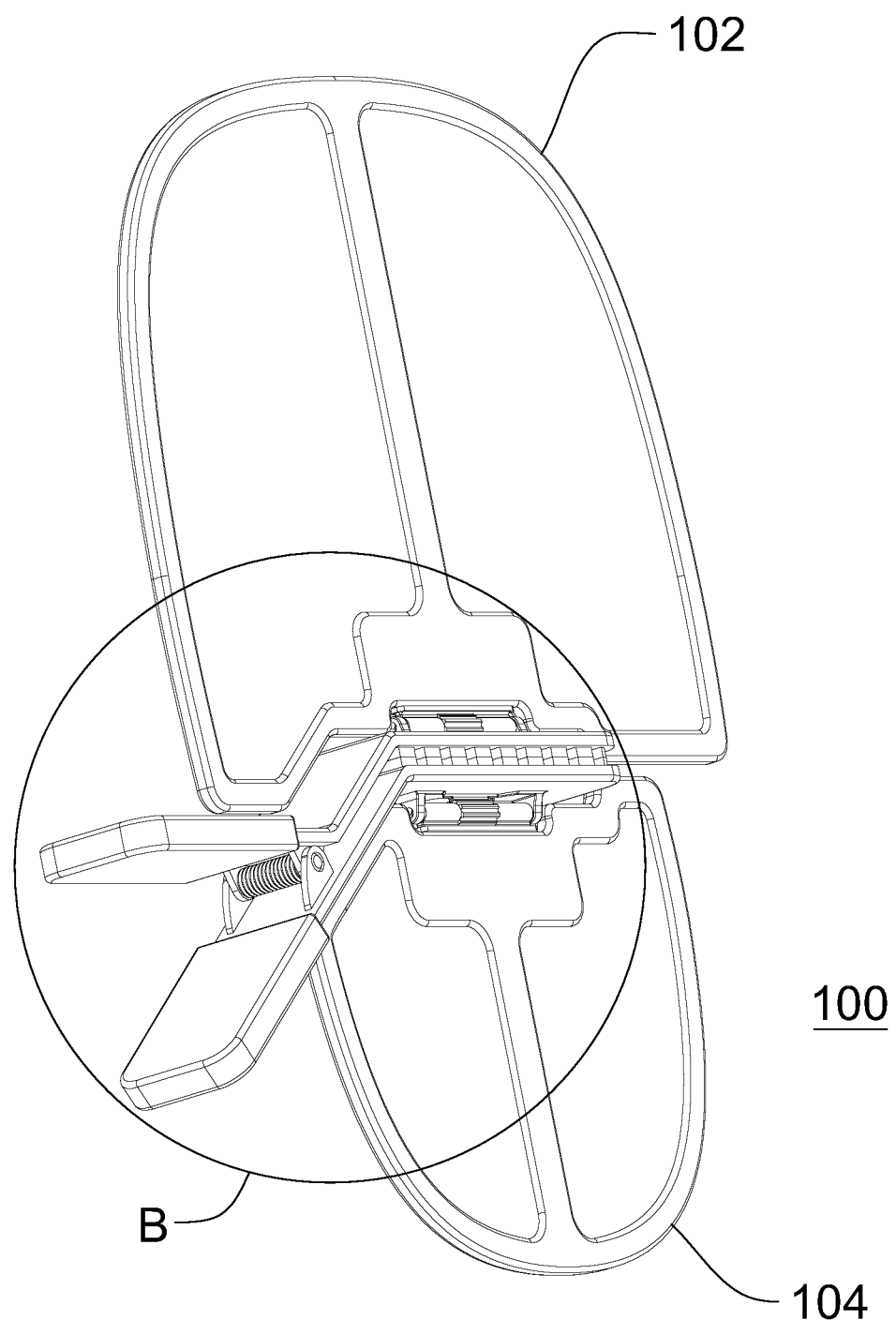
FIG. 1 is a perspective view of the present invention in a closed position.

Adverting now to the figures, FIG. 1 shows the chef shield 100 in a closed position without a cooking utensil. During cooking, a user, e.g. a chef, holds a cooking utensil with his hand while engaging with a heat source. The cooking utensil is either an accessory, e.g. a spatula, or a handle of a cooking pan. A user holds the proximal end of the cooking utensil when cooking food over the heat source. The distal end of the cooking utensil engages with the heat source. The user holds the end of the cooking utensil at the farthest position on the handle away from the heat source. Holding the cooking utensil at this position allows the user to manipulate and otherwise engage the items in the pan while keeping their hand/arm at the farthest possible position away from the heat source to minimize burns and/or injury.

FIG. 1 shows the upper shield 102 and lower shield 104 in a substantially vertical plane and parallel to each other.

The chef shield 100 is designed to be removably secured to a cooking utensil, such as a spatula. When a user (e.g. a chef) holds a spatula handle while cooking, the chef shield 100 protects the user's hand and arm from being burned or harmed by splashing oil or other debris coming from the frying pan or heat source. A heat source is defined as a stovetop burner, open flame, infrared heating element, wok range, or any other device that produces heat. While the objective is to protect a user's limbs from hot debris while holding the handle of a cooking utensil, the chef shield also protects the user from getting dirty even when the debris is not hot.

Figure 2:
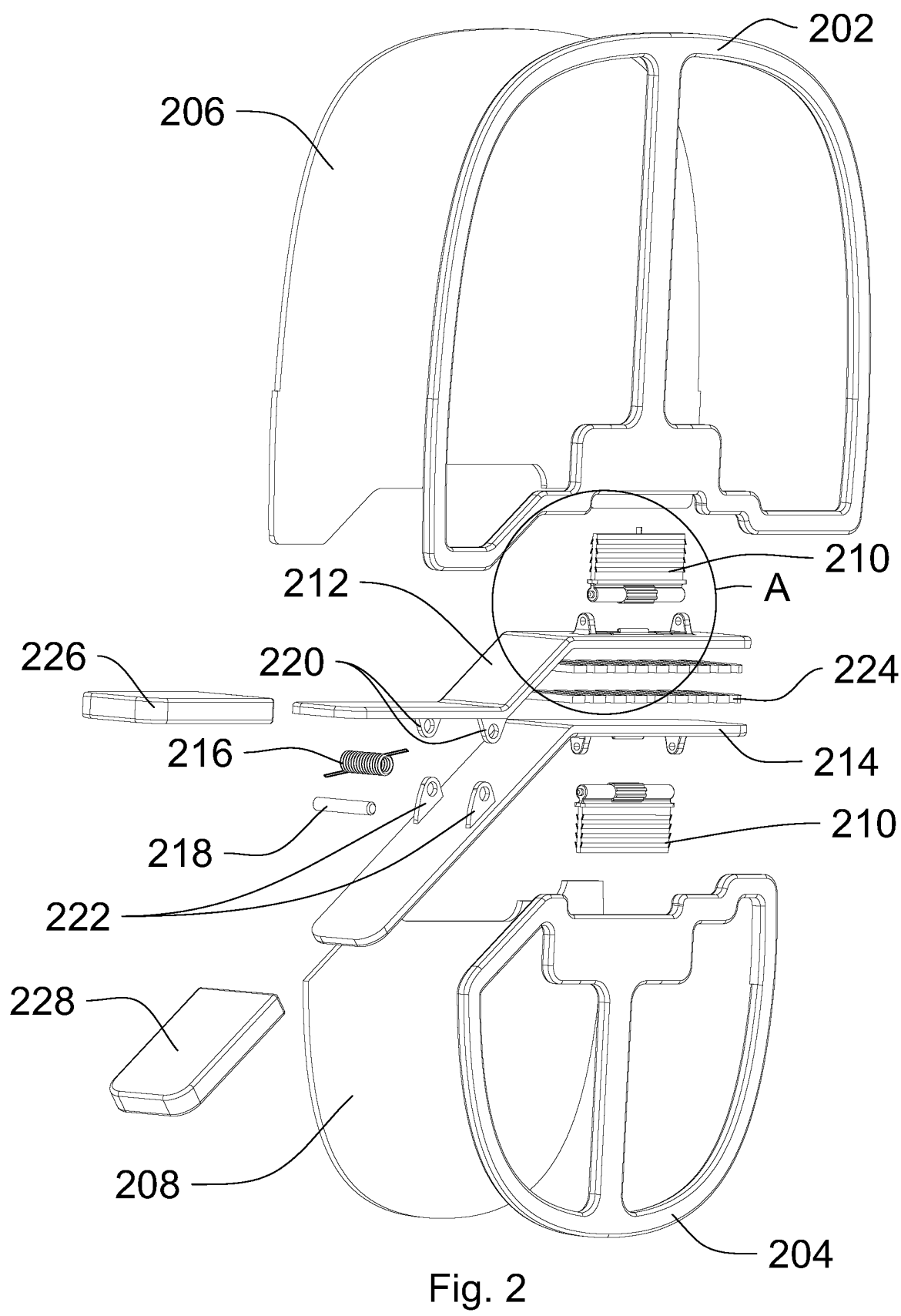
FIG. 2 is an exploded view of the present invention in a closed position.

FIG. 2 illustrates an exploded view of the components in the chef shield 100.

Upper shield 102 includes upper frame 202 and upper panel 206. Similarly, lower shield 104 includes lower frame 204 and lower panel 208. Panels 206, 208 are secured to frames 202, 204 permanently or temporarily, depending on the kitchen environment. Panels 206, 208 are made from a stainless steel mesh. The connection between panels 206, 208 and frames 202, 204 is optionally bonded, adhesive, rivet and other means as the connection varies based on the environmental conditions. In an exemplary embodiment, the panels 206, 208, are made from a stainless steel mesh, silicone, or translucent material and frames 202, 204 are made from a thermoplastic elastomer (TPE) or similar polymer. In some cases, a user will have better visibility using a panel made in a mesh pattern opposed to a translucent solid material.

The mesh is designed as a barrier that prevents debris from splashing onto the user holding the spatula. Frames 202, 204 have an outside edge and center support to fully support the panels 206, 208. In an exemplary embodiment, the shields 102, 104 are unitary in construction instead of having two components such as the frames 202, 204 and panels 206, 208. While the shields 101, 104 are depicted in a curvilinear profile, in yet another embodiment the shields are circular, rectangular, or other desire profile based on the needs of the user and cooking environment.

Figure 3:
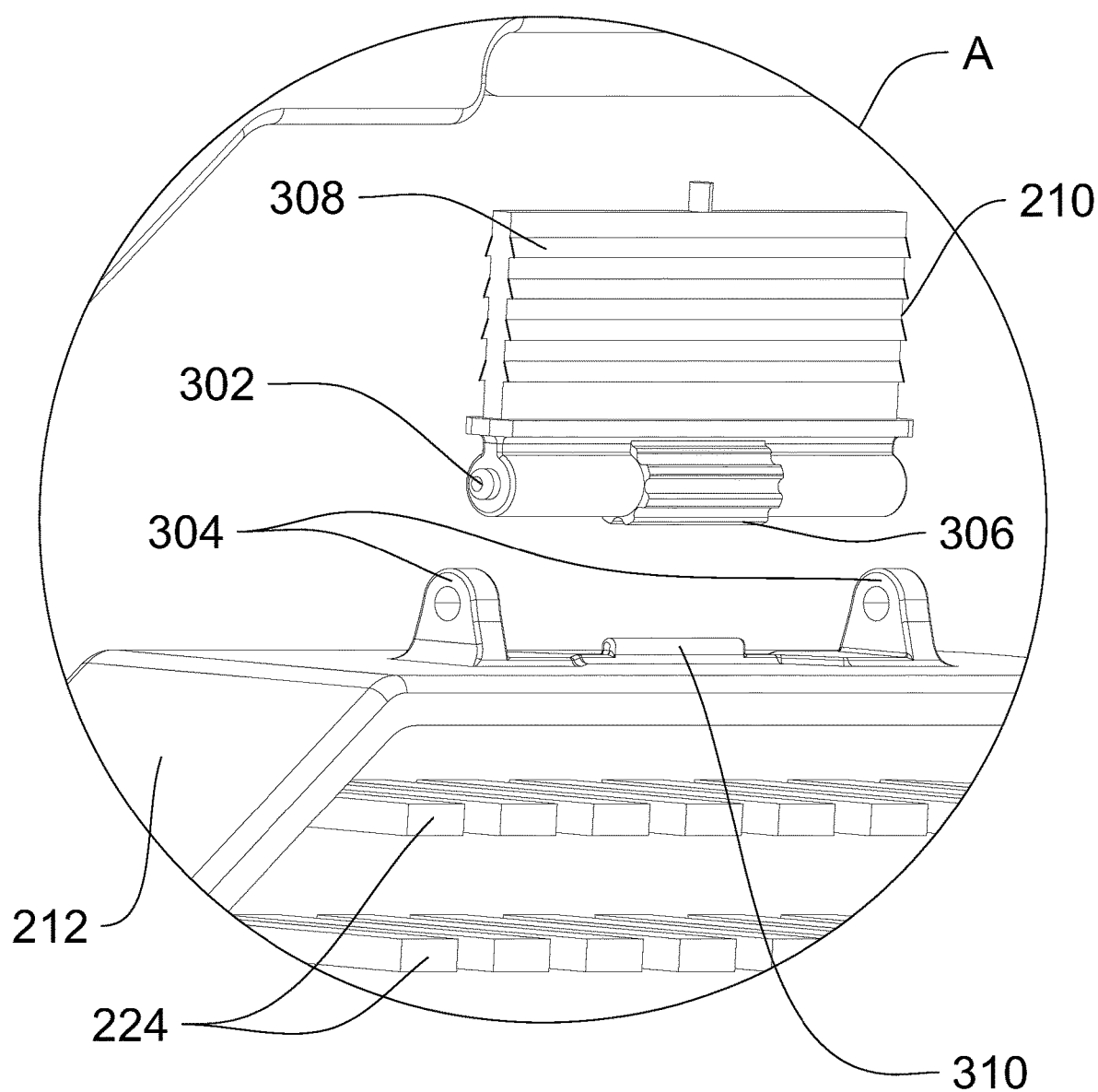
FIG. 3 is a zoomed view A of a connector and upper clip from FIG. 2.

Connector 210 secures upper frame 202 to upper clip 212. As shown in FIG. 3, eyelets 304 protrude from upper clip 212. Tabs 302 on connector 210 are connected through a press fit into eyelets 304. This connection allows rotational movement of connector 210 relative to upper clip 212. The rotational movement is limited to fixed positions due to the interaction between ratchet slots 306 on connector 210 and clip slots 310 on upper clip 212. When connector 210 rotates about upper clip 212, ratchet slots 306 limit the rotation to fixed increments, such as 10 or 15 degrees. In an exemplary embodiment, connectors 210 and clips 212, 214 are made from a high density polyethylene (HDPE) resin.

Connector 210 also includes ridges 308. Connector 210 is inserted into a channel or opening in upper frame 202 and held into place by the ridges 308. The ridges 308 create a removable press fit between the connector 210 and upper frame 202. This allows the upper frame 202, or when combined with the upper panel 206, the upper shield 102, to be removed from the connector 210. Once removed, upper shield 102 can be replaced by a different style of shield or cleaned by the user before the chef shield 100 is stored for the next use.

A second connector 210 secures lower frame 204 to lower clip 214. As shown in FIG. 3, eyelets 304 protrude from lower clip 214. Tabs 302 on connector 210 are connected through a press fit into eyelets 304. This connection allows rotational movement of connector 210 relative to lower clip 214. The rotational movement is limited to fixed positions due to the interaction between ratchet slots 306 on connector 210 and clip slots 310 on lower clip 214. When connector 210 rotates about lower clip 214, ratchet slots 306 limit the rotation to fixed increments, such as 10 or 15 degrees.

Connector 210 also includes ridges 308. Connector 210 is inserted into a channel or opening in lower frame 204 and held into place by the ridges 308. The ridges 308 create a removable press fit between the connector 210 and lower frame 204. This allows the lower frame 204, or when combined with the lower panel 208, the lower shield 104, to be removed from the connector 210. Once removed, lower shield 104 is replaced by a different style of shield, cleaned by the user before the chef shield 100 is stored for the next use, or let stays removed depending on the needs of the user.

Connectors 210 includes ridges 308 which create a removable connection with frames 202, 204. In an exemplary embodiment of the instant invention, connectors 210 have a snap connection or other removable connection means to secure connector 210 to the respective frames 202, 204.

Connectors 210 include tabs 302 that press fit into eyelets 304 of clips 212, 214. The interaction between the tabs 302 and eyelets 304 allow for the rotational movement between the frames 202, 204, through connectors 210, and clips 212, 214 respectively. In exemplary embodiments, other rotational means are employed that allow connectors 210 to rotate relative to clips 212, 214.

As shown in FIG. 2, upper clip 212 is connected to lower clip through spring 216 and hinge rod 218. Hinge rod 218 passes through upper spring supports 220, spring 216, and lower spring supports 222 to rotatably connect clips 212, 214. Upper clip cover 226 slides onto the handle of upper grip 212. Lower clip cover 228 slides onto the handle of lower grip 214. When assembled, a user presses the clip 212, 214 handles located at covers 226, 228 to open and close the chef shield 100. The chef shield 100 opens and closes under a tension force that results from the interaction of the spring 216 on the clips 212, 214. In an exemplary embodiment, covers 226, 228 are made from TPR. While a spring force is used in the instant invention, other means capable of creating a tension force on clips 212, 214.

Figure 4:
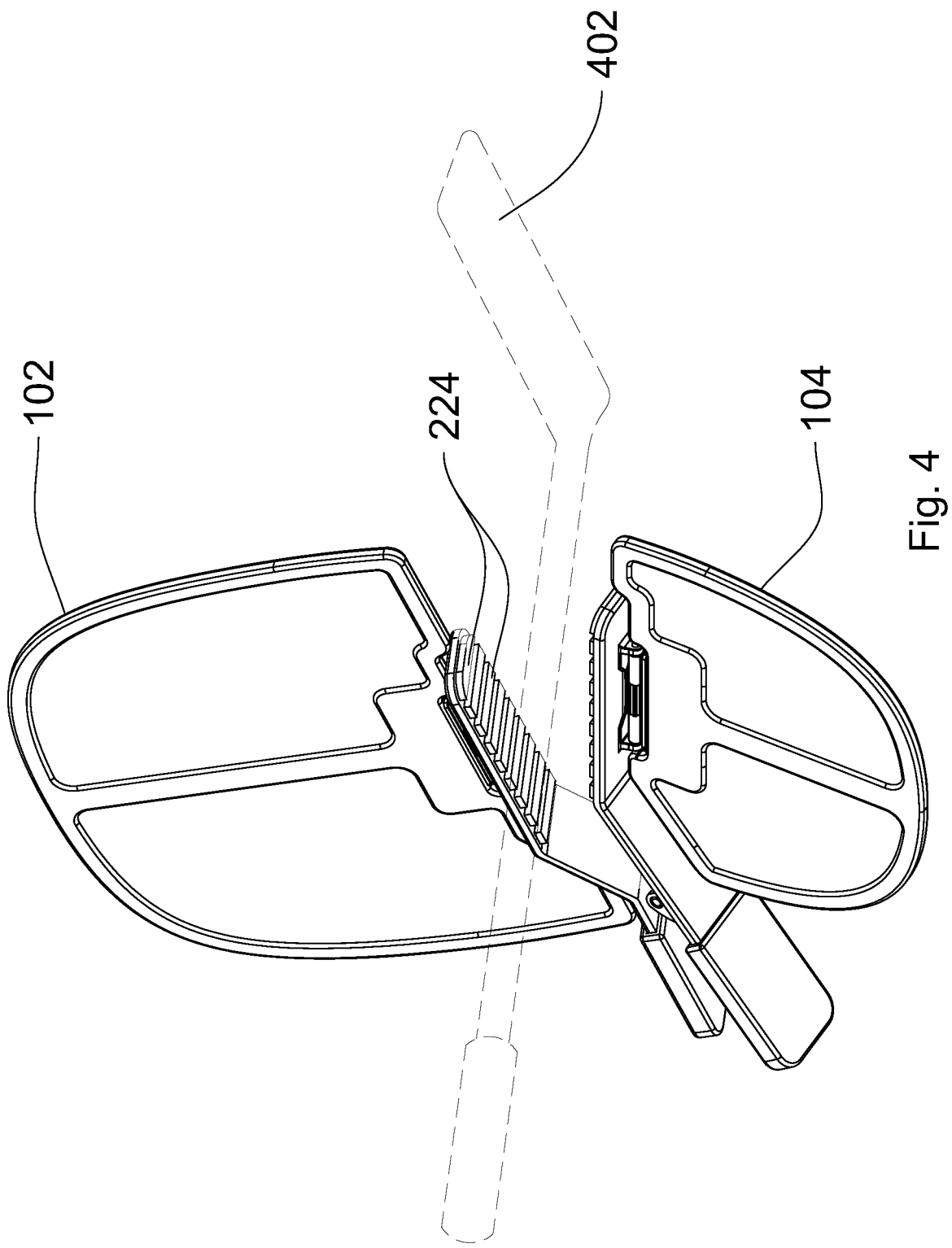
FIG. 4 is a perspective view of the present invention in an open position engaging with a cooking utensil.

To use the chef shield 100, a user opens the chef shield 100 by pressing on clips 212, 214 at the handles located at covers 226, 228. The open chef shield 100 is then positioned over a cooking utensil 402, as shown in FIG. 4. During typical operation, the chef shield 100 is positioned over the handle of the cooking utensil 402, such as a spatula handle or frying pan handle. Once positioned over the cooking utensil 402, the user releases clips 212, 214 to allow the clips 212, 214 to come in contact with the cooking utensil 402. In an exemplary embodiment, clips 212, 214 narrow in width. A user engages clips 212, 214 at their proximal ends, i.e. at covers 226, 228. The clips 212, 214 are largest in width at the proximal end of the clips 212, 214 and are most narrow where the grippers 224 engage with the clips 212, 214. In other exemplary embodiments of the instant invention, the width of clips 212, 214 vary based on the type of cooking utensil that is used with the chef shield 100.

Clips 212, 214 come in contact with cooking utensil 402 through grippers 224. As shown in FIG. 4, grippers 224 are secured onto the bottom surface of upper clip 212 and the top surface of the lower clip 214. Grippers provide added to help secure the chef shield 100 onto the cooking utensil 402. The spring force exerted from clips 212, 214 are the primary force used to secure the chef shield 100 to the cooking utensil 402. The use of the grippers 224 reduces the ability of the chef shield 100 from slipping relative to the cooking utensil 402. Grippers 224 are made out of silicone, to further increase the friction between the cooking utensil 402 and the chef shield 100. In preferred embodiments, grippers 224 are made from other materials that provide enough friction to reduce the ability of the cooking utensil 402 from slipping while secured to the chef shield 100. In addition, the material of grippers 224 will vary based on the material of the cooking utensil 402.

FIG. 4 shows the chef shield in an open position engaging with cooking utensil 402. Cooking utensil 402 is depicted as a spatula. However, any cooking utensil with a handle can be used with the chef shield 100. Examples include, but are not limited to a: spatula, frying pan, waffle iron, tong, and wok. Chef shield 100 is positioned over the cooking utensil 402 below the handle where a user holds the cooking utensil 402. This positions the chef shield 100 between the user and the heat source used during cooking. When the cooking utensil 402 is a removable component, such as a spatula, the chef shield 100 protects the user when the user is engaging the spatula with the heat source. When the cooking utensil 402 is a frying pan with a built in handle, the chef shield 100 is positioned on the frying pan handle, which provides a barrier from the frying pan whether or not the user is in close proximity to the heat source.

Figure 5:
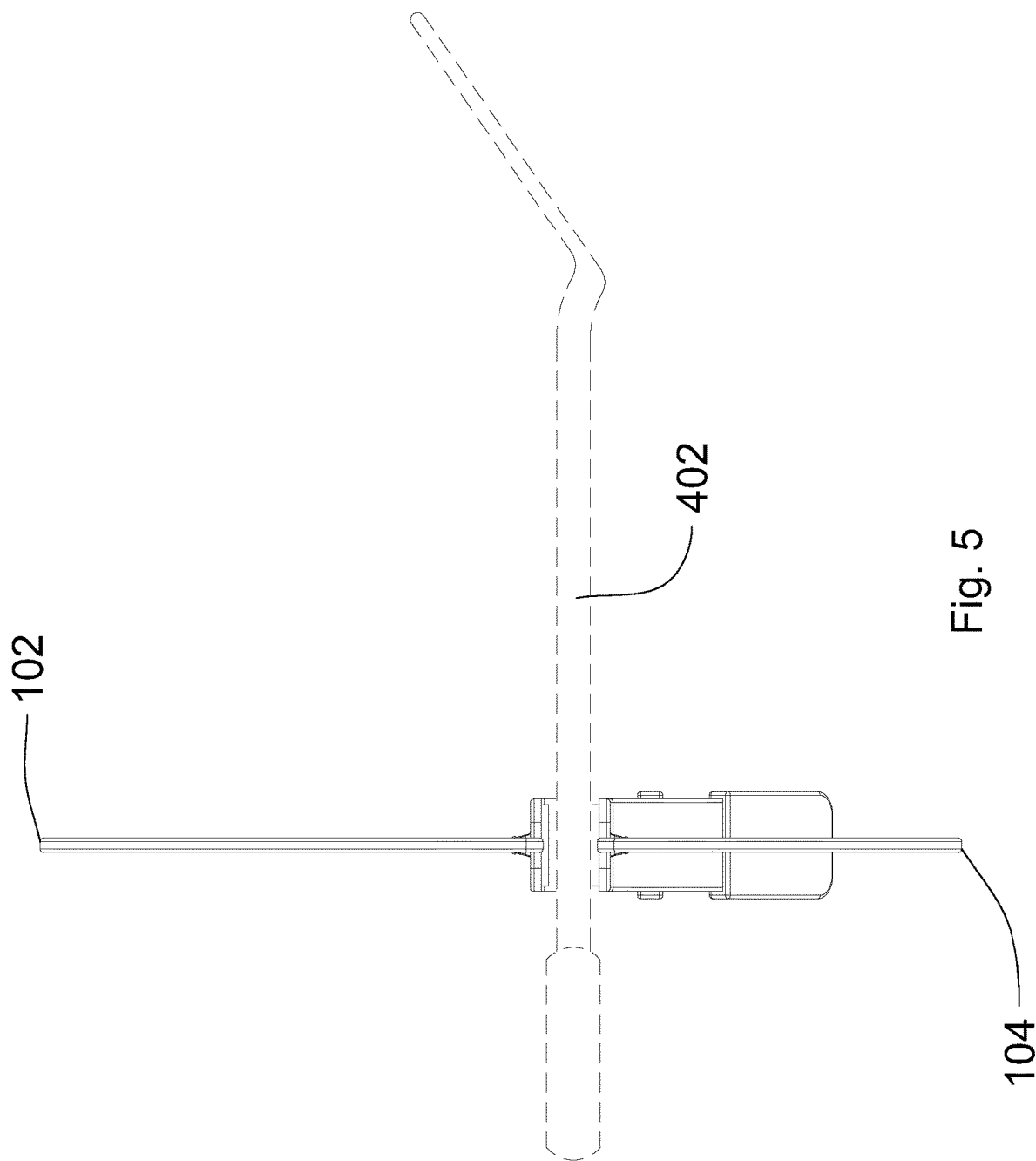
FIG. 5 is a side view of the present invention in a closed position engaged with a cooking utensil with the shields in a vertical position.
Figure 6:
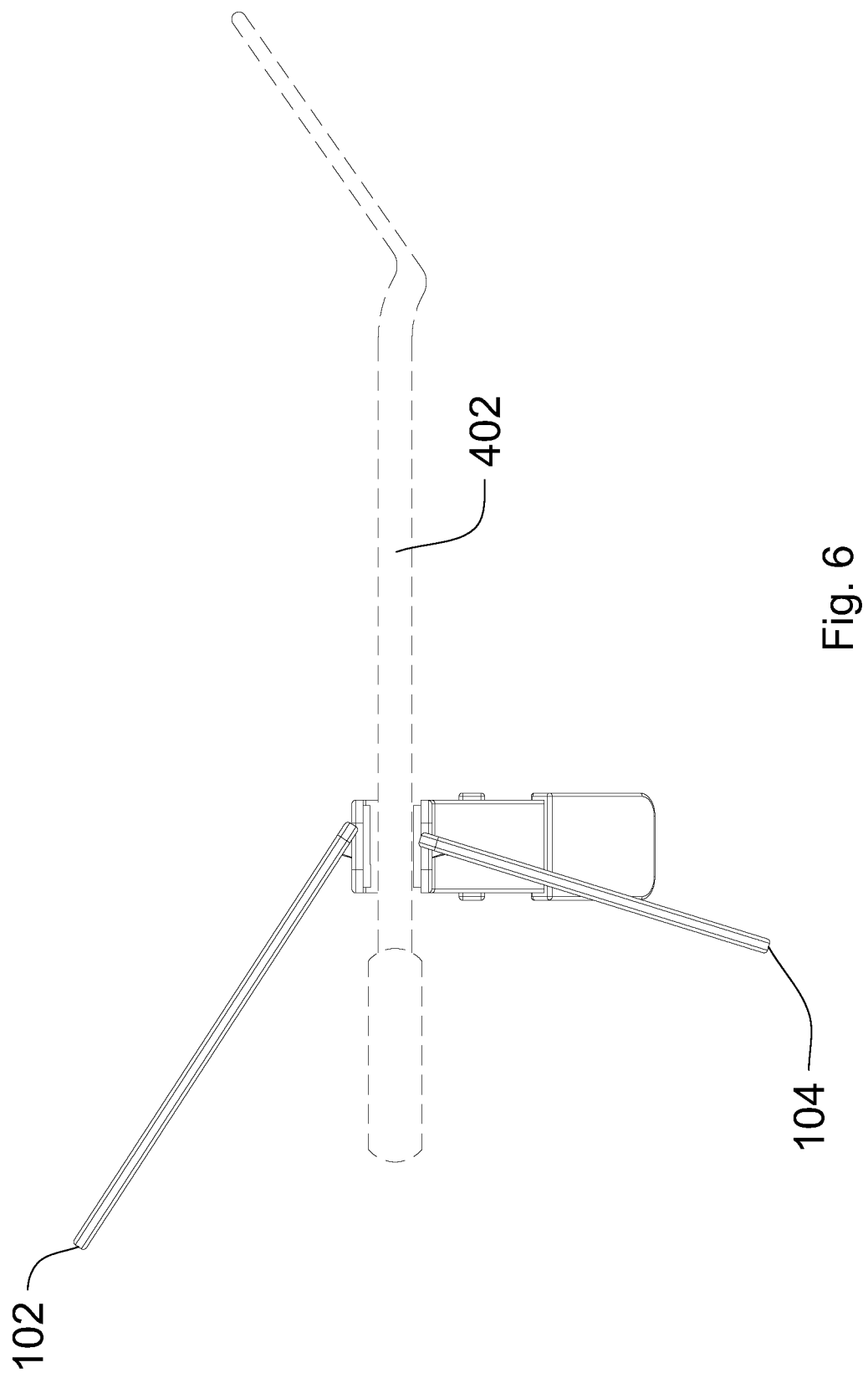
FIG. 6 is a side view of the present invention in a closed position engaged with a cooking utensil with the shields positioned inward towards the handle of the cooking utensil.

FIGS. 5 and 6 display the engagement of shields 102, 104 to protect a user from being burned or from other harmful debris while cooking near a heat source. In FIG. 5, the shields 102, 104 are oriented in a substantially vertical position. Shield 102 extends vertically upward from upper frame 202 and shield 104 extends vertically downward from lower frame 204. In some cooking situations, the vertical positioning in FIG. 5 is advantageous to protect the user.

In other situations, it is advantageous for the user to move the shields 102, 104 to a non-vertical position. To move shields 102, 104, the user exerts an inward or outward force to rotate connector 110 relative to the respective shield 102, 104. This action is done for each shield as shields 102, 104 move independently of one another. In an exemplary embodiment, shields 102, 104 are connected and both shields 102, 104 move inward in unison or both shields 102, 104 move outward in unison.

As shown in FIG. 6, shields 102, 104 are oriented inward relative to the baseline position in FIG. 5, i.e. a substantially vertical plane. Rotating the shields 102, 104 inward provides a greater barrier for the user's hand and/or arm while using the cooking utensil 402 near a heat source. In an exemplary embodiment, the shields 102, 104 are rotated inward when using a spatula, spoon, thongs, or other tool that use used to stir or agitate food on the heat source. In another exemplary embodiment, the shields 102, 104 are substantially vertical, as in FIG. 5, when using the chef shield 100 on a handle of a frying pan, wok, or similar pan that is directly on the heat source. This provides for a greater surface area closer in proximity to the heat source to reduce the amount of debris (e.g. hot oil) splashing from the pan. The ability to orient shields 102, 104 inward in a collapsible position provides for a smaller footprint for storage.

In yet another exemplary embodiment when using the chef shield 100 on a frying pan, the lower shield 104 is disengaged from the chef shield 100 and the upper shield 102 is oriented as necessary by the user. This is to provide spatial flexibility based on the cooking environment. For instance, in some environments, the lower shield 104 may hit a nearby object preventing use of the chef shield 100. In such situations, the lower shield 104 is removed from the chef shield 100 to accommodate the local environment. The same flexibility is provided in the upper shield 102 as well.

Shields 102, 104 rotate inward and outward relative to the vertical plane depicted in FIG. 5 using the ratcheting slots 306 on connectors 210. The ratchet slots 306 on connectors 210 rotate relative to clip slots 310 on clips 212, 214, thereby looking each shied 102, 104 into a user defined stationary position. Based on the user's needs, the shields are rotated into position or, in some cases, one of the shields is removed from the chef shield 100, to maximize the chef shield 100 as a barrier between a user and the debris.

Figure 7:
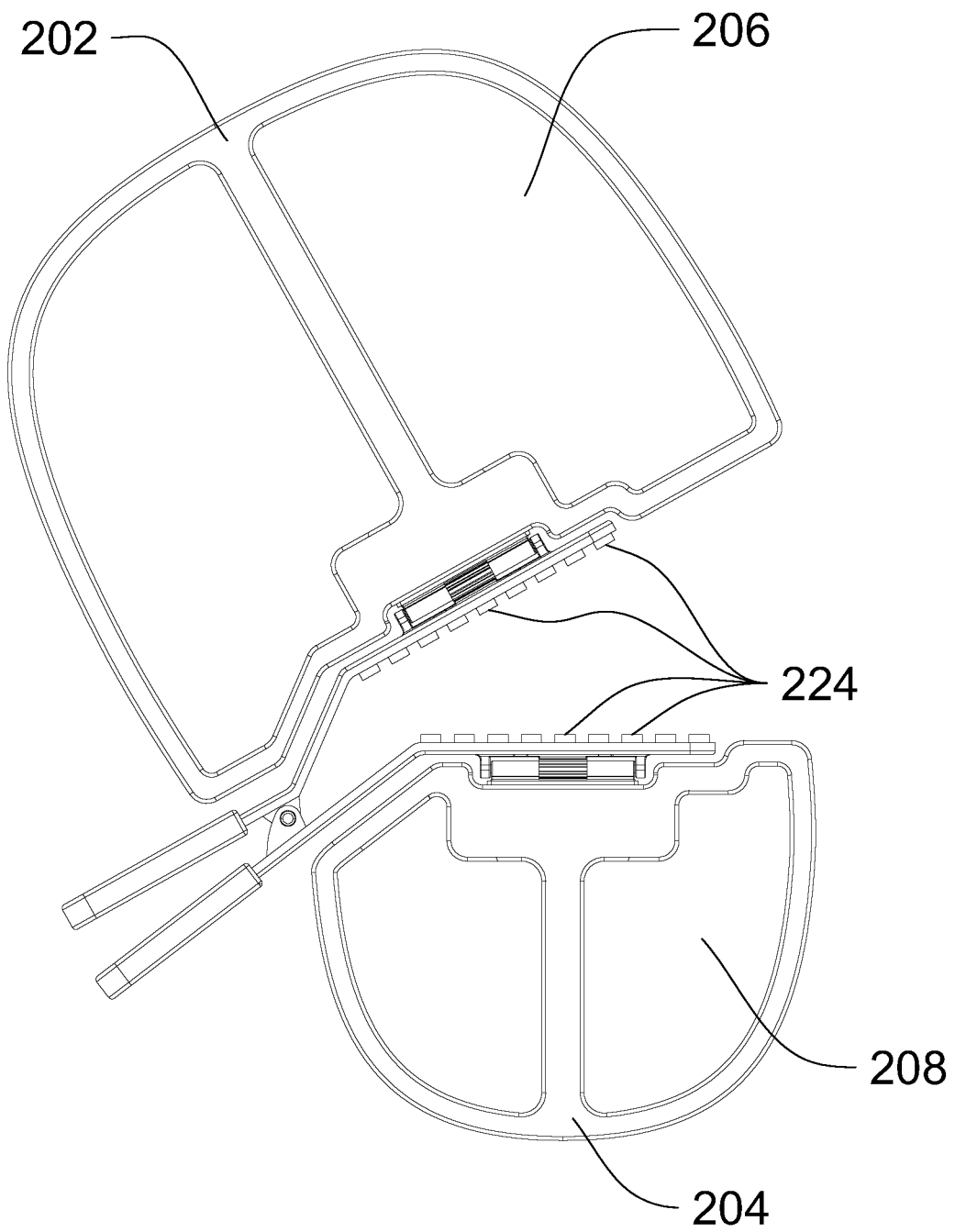
FIG. 7 is a front view of the present invention in an open position.

FIG. 7 shows the chef shield in an open configuration. Either before or after securing the chef shield 100 to a cooking utensil 402, the chef shield is opened by depressing clips 212, 214 at the clip cover 226, 228 locations. This allows the chef shield to be used on a variety of cooking utensils 402.

FIG. 8 is a zoomed in section (B) of FIG. 1. The spring connection and pivot point between clips 212, 214 is shown. When the chef shield 100 is in a closed position, the interaction between the connectors 210, clips 212, 214 and frames 204, 206 are shown in a fully assembled position.

In an exemplary embodiment of the instant invention, an elongated member connects to the cooking utensil 402 instead of one or multiple clips. The elongated member does not rotate as clips 212, 214 pivot using spring 216 and hinge rod 218 described above. Instead, the cooking utensil is inserted through an opening in the elongated member. When the opening is placed in the middle of the elongated member, the cooking utensil 402 is inserted through the elongated member. When the opening is at one of the ends of the elongated member, creating a U shape like a tuning fork, the cooking utensil 402 is engaged with the end of the elongated member.

In this embodiment, shields 102, 104 are connected to the elongated member. As shown in the Figures described above, one or more shields can be used with the instant invention. Connector 210 connects the elongated member to shields 102, 104 using tabs 302 and corresponding member eyelets, similar to eyelets 304 that protrude from clips 212, 214. Connector 210 also has ridges 308 that are inserted into shields 102, 104. The ridges 308 allow the connector 210 to be removed from the shields 102, 104. Connector 210 also contains ratchet slots 306 that engage with element slots in a similar manner as clip slots 310, which allow the shields 102, 104 to be rotated inward and outward on the elongated member.

Upper shield 102 includes upper frame 202 and upper panel 206. Similarly, lower shield 104 includes lower frame 204 and lower panel 208. Frames 202, 204 provide structural support for panels 206, 208. Frames 202, 204 also provide a mounting location for connectors 202, 204. Frames 202, 204 and panels 206, 08 are depicted as components of shields 102, 104. However, shields 102, 104 can be constructed in a unitary fashion that provide sufficient support to engage with connector 210 and rotate relative to the elongated member or clips 212, 214.

In yet another exemplary embodiment of the instant invention, FIG. 9 illustrates a unitary chef shield 900. The unitary chef shield 900, includes shields 102, 104, connectors 210, and unitary cooking utensil 902. For this embodiment, the shields 102, 104 themselves are removable from the connectors 210, but unitary cooking utensil 902 is manufactured with components to connect to the connectors 210 and corresponding shields 102, 104.

The unitary chef shield 900 allows for rotatable orientation as described herein, but the mounting components are constructed on the unitary cooking utensil 902 and are not removable relative to the cooking utensil 402 as with the chef shield 100. The connectors 210 engage with the cooking utensil 902 directly, not through a separate clip or removable component that attaches to the cooking utensil.

In yet another exemplary embodiment, the instant invention includes a cooking utensil 402 or unitary cooking utensil 902 with interchangeable end pieces. The end pieces are removably connected to the base portion of the respective cooking utensil. The interchangeable end pieces allow the user to use a wide array of cooking utensils through a singular handle in conjunction with the chef shield 100 or unitary chef shield 900. The user has the capability to interchange end pieces for a spatula, ladle, spoons, and similar utensils with the safeguards provided by using the different utensils with the safety benefits of the shields 102, 104. A removable connection is used to change the end pieces on cooking utensil 402 or unitary cooking utensil 902, such as but not limited to the following connection means: male/female; screws, snaps, slides, hook and loop type fasteners, and clamps. While a sampling of connection means are provided as examples, any connection method could be used to removably connect cooking utensil 402 or unitary cooking utensil 902 with an array of end pieces.

An additional benefit of the interchangeable end pieces is the ability of the user to quickly change the material of the utensil being used, not only the type of utensil, depending on the items being cooked. For instance, when the user is cooking an omelet, the optimal spatula is a rubber or silicone based material end piece. However, when the user is cooking fish, a metal or harder material is preferred. The ability of a user to quickly change ends pieces, with the added safety protection of shields 102, 104, allows the user to cook a variety of items while maintain the benefit of the shields 102, 104 on chef shield 100 or unitary chef shield 900.

In an exemplary embodiment, a camera is positioned on the cooking utensil 402 or unitary cooking utensil 902. The camera allows the user to view the food that is being cooked using a tablet, mobile device, or computer. The camera is connected to the Internet using known non-wired technologies, such as wireless internet ("Wi-Fi") or BLUETOOTH. By using the camera in conjunction with infrared technology, the user is able to monitor typical cooking metrics, such as but not limited to temperature and cooking time. Temperature may include the pan temperature, oil or liquid temperature in the pan itself, and the outer surface of the food items being cooked.

By sensing the temperature of the cooking pan, through the use of a heat grid or other temperature sensing means, the user is able to manually or automatically vary the temperate of the heat source. The heat source may be the stove stop or a self-generated heating element within the cooking pan itself.

Optionally, the chef shield 100 or unitary chef shield 900 is used in conjunction with a cooking pan that includes a gyroscope or other orientation sensing device or software. The use of a gyroscope allows a cooking pan cover to automatically deploy and/or close the shield on top of the cooking pan when the camera or gyroscope detects the cooking pan is tipping over. Instead of the cooking pan tipping over, spilling hot liquids over the heat source and/or the user directly, the gyroscope senses the impending disorientation of the cooking pan and triggers the shield or cover to enclose the cooking pan, like a cooking pot lid, to contain the hot liquids within the cooking pan.

This protects the user directly, the kitchen staff, and the integrity of the kitchen, by preventing the controlled heat source from spilling its contents and expanding into a major conflagration. The gyroscope includes movable components that are balanced when the cooking pan is at a level configuration. If the cooking pan with the gyroscope moves past a certain threshold from the horizontal plane, from a user or predefined angle/value, the gyroscope triggers the deployment of the cover and/or shield.

If a cover is deployed from the chef shield, it is projected outward to substantially cover the top of the cooking pan. Since the cover is coming into direct contact with the hot pan and/or heat source, the cover is a flame retardant material. The cover encapsulates the cooking pan to prevent the contents from escaping. Alternatively, the upper shield 102 of the chef shield is deployed from the chef shield to cover the top of the cooking pan. In either embodiment, the cover and upper shield 102 is sized to cover the top of the cooking pan surface.

The gyroscope operates independently or through a wired or wireless Internet connection using a software application. This application can notify the user of a triggering event, i.e. the cooking pan tipping over, based on user defined variables, such as orientation angle of the cooking pan.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A chef shield device, comprising:
   at least one clip, wherein at least one shield is connected to the at least one clip;
   the at least one clip is secured to a cooking utensil;
   the at least one shield extending outward from the at least one clip in an angular position relative to the longitudinal axis of the cooking utensil;
   an upper shield connected to an upper clip;
   a lower shield connected to a lower clip;
   a first connector used to removably connect the upper shield to the upper clip, and
   a second connector used to removably connect the lower shield to the lower clip.

2. The chef shield device as recited in claim 1, wherein the upper shield and lower shield are independently rotatably connected to the clips.

3. The chef shield device as recited in claim 2, wherein the connectors have a plurality of ridges that engage with the shield.

4. The chef shield device as recited in claim 2, wherein:
   the upper shield is comprised of an upper panel secured to an upper frame, and the lower shield is comprised of a lower panel secured to a lower frame.

5. The chef shield device as recited in claim 2, wherein ratchet slots on at least one connector engages with clip slots on at least one clip.

6. The chef shield device as recited in claim 1, wherein the upper and lower clips are rotatably connected.

7. The chef shield device as recited in claim 1, wherein grippers are secured to the upper and lower clips to secure the chef shield to the cooking utensil.

* * * * *